United States Patent [19]

Sato et al.

[11] 4,453,407

[45] Jun. 12, 1984

[54] VIBRATION DIAGNOSIS METHOD AND APPARATUS FOR ROTARY MACHINES

[75] Inventors: Kazuo Sato, Kitaibaraki; Masakazu Takasumi; Kouki Shiohata, both of Ibaraki; Motoji Ohmori; Motohiro Shiga, both of Hitachi; Fumio Fujisawa, Mito, all of Japan

[73] Assignee: Hitachi, Ltd., Tokyo, Japan

[21] Appl. No.: 255,105

[22] Filed: Apr. 17, 1981

[30] Foreign Application Priority Data

Apr. 17, 1980 [JP] Japan ................................. 55-49601
Sep. 1, 1980 [JP] Japan ............................... 55-119713

[51] Int. Cl.³ ........................................... G01M 1/22
[52] U.S. Cl. ..................................... 73/462; 73/660; 364/508
[58] Field of Search ................. 73/462, 659, 660, 579, 73/593; 364/508, 551, 554, 556

[56] References Cited

U.S. PATENT DOCUMENTS

| | | | |
|---|---|---|---|
| 4,010,637 | 3/1977 | Harwell et al. | 73/660 |
| 4,184,205 | 1/1980 | Morrow | 364/508 |
| 4,196,629 | 4/1980 | Philips | 73/462 X |
| 4,220,995 | 9/1980 | Shoda | 364/508 |
| 4,302,813 | 11/1981 | Kurihara et al. | 73/462 X |

*Primary Examiner*—James J. Gill
*Attorney, Agent, or Firm*—Antonelli, Terry & Wands

[57] ABSTRACT

A vibration diagnosis method and apparatus for rotary machines adapted for measuring the vibration of rotor shaft of a rotary machine, extracting the vibration component synchronous with the revolution of the rotor shaft from the measured vibration data, comparing the amplitude of the extracted vibration component with the amplitude of the overall vibration, analyzing the causes of the synchronous vibration component when the result of the comparison meets a predetermined reference, judging, in accordance with the result of the analysis, whether the vibration due to mass unbalance is attributable to an abrupt generation of mass unbalance or to a thermal bow of the rotor shaft, and displaying the result of the judgment. The analysis of the vibration component is made in real time or making use of data stored in the past.

19 Claims, 14 Drawing Figures

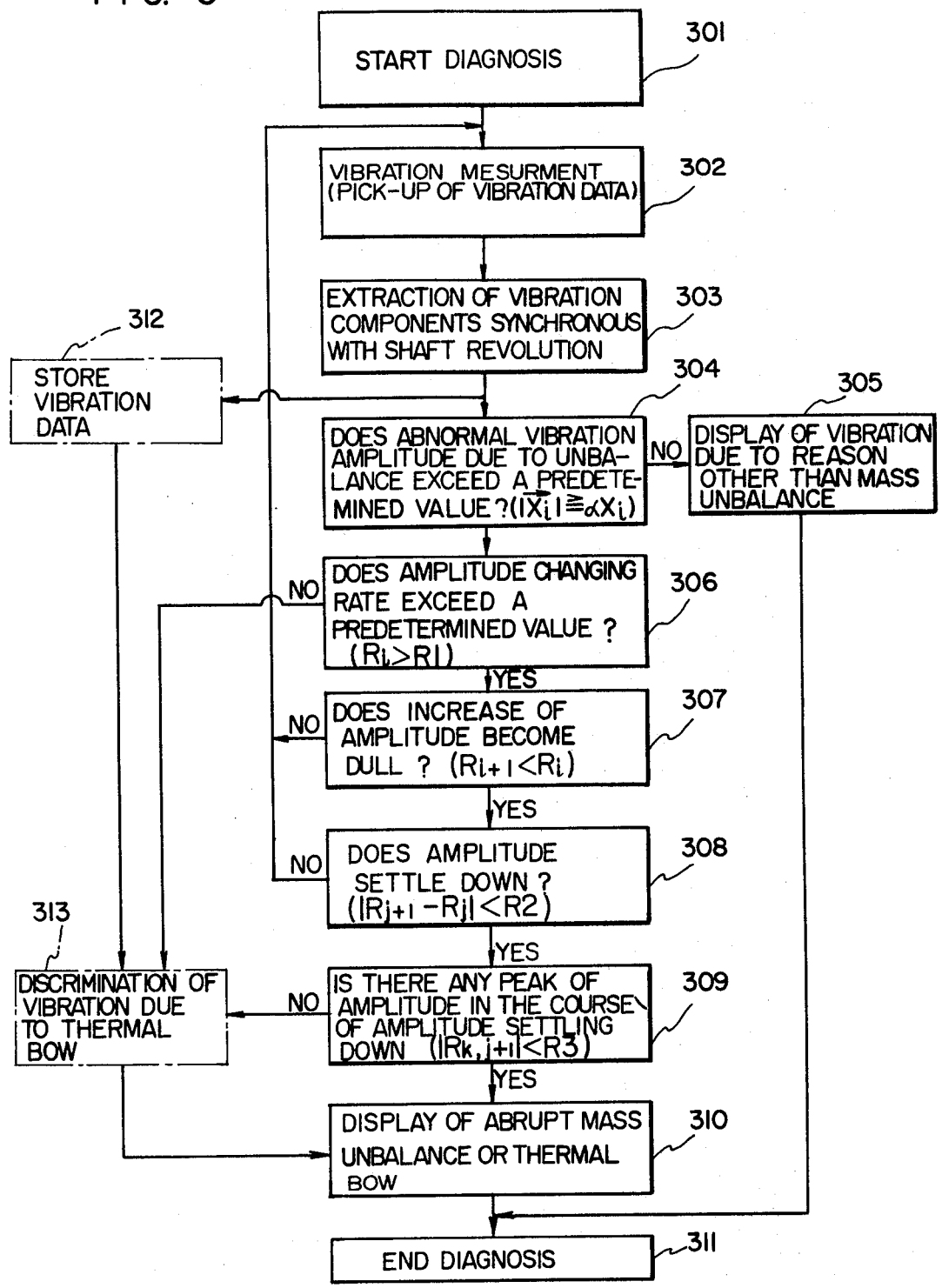

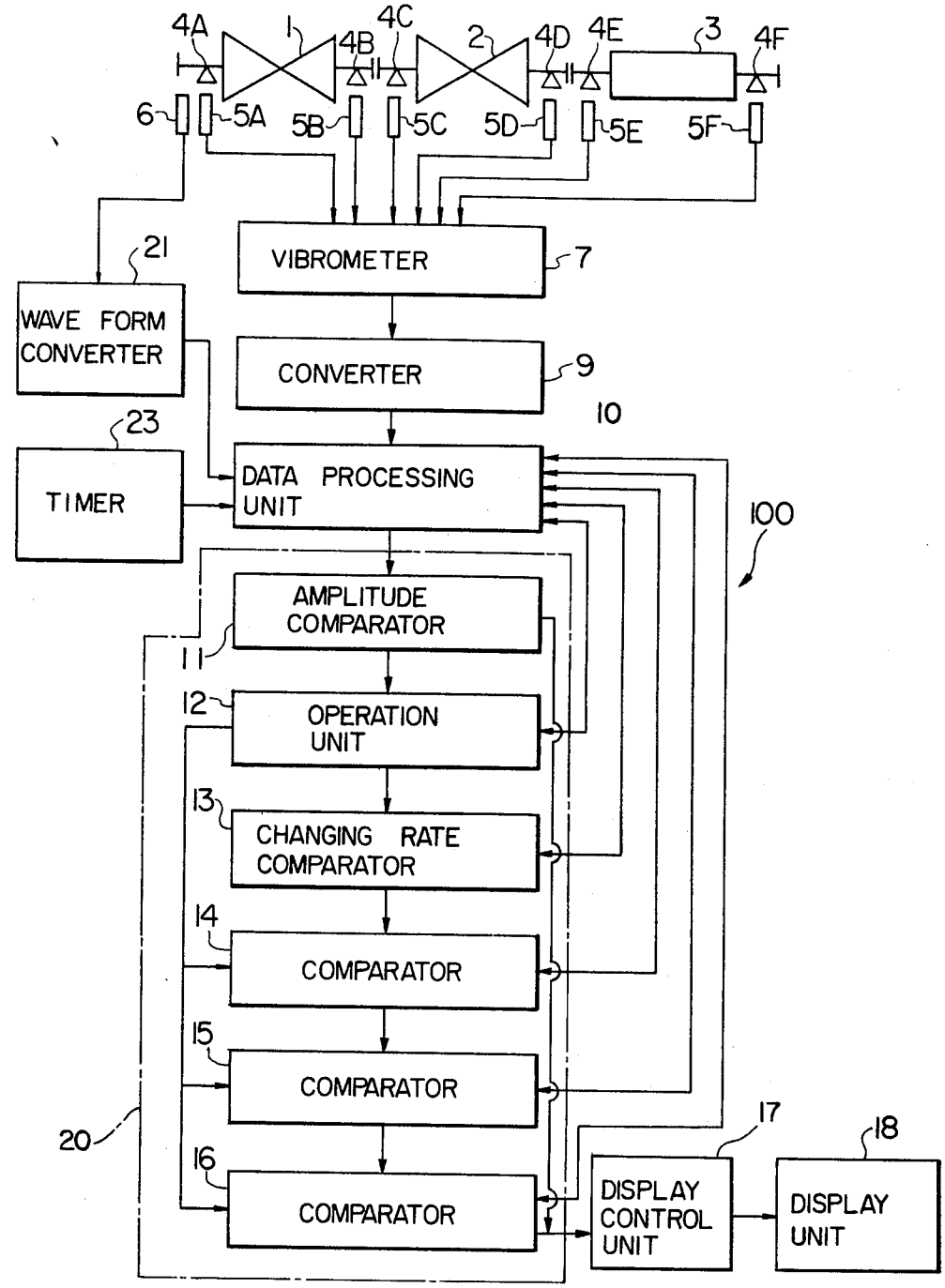

VIBRATION DIAGNOSIS METHOD AND APPARATUS FOR ROTARY MACHINES

BACKGROUND OF THE INVENTION

The present invention relates to a vibration diagnosis method and apparatus for rotary machines and, more particularly, to a vibration diagnosis method and apparatus suitably used for the vibration diagnosis of turbines and generators in thermal power plants and nuclear power plants, or the like rotary machines.

Recently, the capacities of steam turbines and generators in power plants are becoming greater and, accordingly, the size of the rotor of the turbine or generator is becoming larger. Due to the limitation in the shaft stress, the increase of the capacity of such rotary machines cannot be achieved by an increase of the shaft diameter solely. Namely, it is necessary to increase the length of the rotor shaft. The increased shaft length, however, imposes various problems such as reduction of shaft rigidity which in turn tends to produce vibration undesirably.

On the other hand, it is recognized that any failure in turbine or generator having large capacity causes serious social and economical problems, and requires much money and time for the repair. For these reasons, there is an increasing demand for the prevention of failure in these rotary machines.

It is also a current tendency to use a power plant of comparatively large capacity for adjustment of load to absorb the peak load. For such purpose, the power plant of comparatively large capacity has to be started and stopped frequently. This in turn gives a rise to a demand for enhanced safety in the frequent starting and stopping of the power plant. Vibration monitoring in such rotary machines has gained in importance as an effective measure for safe operation of these rotary machines. More specifically, it is required not only to monitor the level of the vibration but also to investigate and diagnose the vibration phenomenon and the cause thereof.

In the operation of these rotary machines, the vibration due to unbalanced mass is generated in synchronism with the revolution speed. This vibration is important as an object of the diagnosis, because it is generated most frequently.

The vibration due to unbalanced mass can be diminished by obtaining a balance of mass. At the beginning period of use of the machine, therefore, it is possible to reduce unbalance of mass caused in the process for manufacturing and assembling the rotor.

Unfortunately, however, the level of the vibration becomes greater as the rotary machine is used long, because of generation of unbalanced mass due to bow of the rotor, contact (rubbing) of rotor with a stationary part, losing of part or member of the rotor or other reasons which may occur during the operation of the rotary machine.

Among these reasons, the losing of the rotor parts such as blade, bolts or the like causes an abrupt increase of the vibration amplitude. It is, therefore, very important to discriminate this phenomenon caused by an abrupt generation of mass unbalance.

A change in the load applied to the turbine rotor or change in the electric load on the rotor of generator may cause a thermal unbalance in the rotor to produce a bow of the rotor generally referred to as "thermal bow".

The generation of such thermal blow is equivalent to a generation of an unbalanced mass in the rotor, and also causes a vibration.

Thus, although the vibration due to accidental generation of unbalanced mass and vibration due to thermal bow resemble each other, different countermeasures have to be taken depending on the causes of the vibration, i.e. whether the vibration is attributable to an abrupt generation of unbalanced mass or to a generation of thermal bow.

Therefore, in order to prevent any accident in the rotary machine, as well as to rationalize the maintenance, it is quite a rational measure to promptly and correctly discriminate the cause of the abnormal vibration of rotor when such a vibration has taken place.

Hitherto, such a method has been adopted as to discriminate the cause of abnormal vibration making use of the difference in frequency. However, since the vibration due to abrupt generation of mass unbalance and the vibration due to thermal bow have equal frequency, it is not possible to effectively discriminate with this method the cause of the vibration taking place in the rotary machine.

SUMMARY OF THE INVENTION

Accordingly, it is an object of the invention to provide a vibration diagnosis method and apparatus for rotary machines, capable of discriminating the causes of the vibration due to unbalanced mass.

It is another object of the invention to provide a method of and apparatus for automatically discriminating whether unbalanced vibration is attributable to abrupt mass unbalance or thermal bow.

To these ends, according to an aspect of the invention, there is provided a vibration diagnosis method having the steps of: measuring the vibration of rotor shaft of a rotary machine to obtain vibration data; extracting from the vibration data the vibration component synchronous with the revolution of the rotor shaft; comparing the amplitude of the extracted vibration component with the amplitude of the overall vibration; analysing, when a predetermined condition is met as a result of the comparison, the extracted vibration component to discriminate whether such unbalanced vibration is attributable to an abrupt generation of mass unbalance or to thermal bow of the shaft: and displaying the result of the analysis.

The judgement of the generation of abrupt mass unbalance can be made by processing in real time the vibration data which momentarily varies or by processing the past vibration data. The judgement as to the thermal bow is achieved by processing the vibration data obtained within a predetermined period of time from a moment in the past to the present moment.

These and other objects, as well as advantageous features of the invention will become clear from the following description of the preferred embodiments taken in conjunction with the accompanying drawings.

BRIEF DESCRIPTION OF THE DRAWINGS

FIG. 3 is a flow diagram of a vibration diagnosis method for rotary machines in accordance with an embodiment of the invention;

FIG. 5 is a schematic illustration of a vibration diagnosis apparatus for rotary machines, in accordance with an embodiment of the invention;

DESCRIPTION OF THE PREFERRED EMBODIMENTS

Figure 1A:
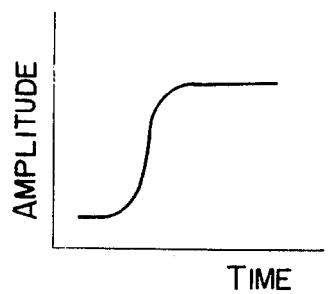
FIGS. 1A and 1B are illustrations of characteristics peculiar to an accidental generation of mass unbalance.
Figure 1B:
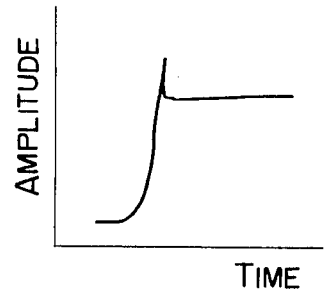
Figure 2:
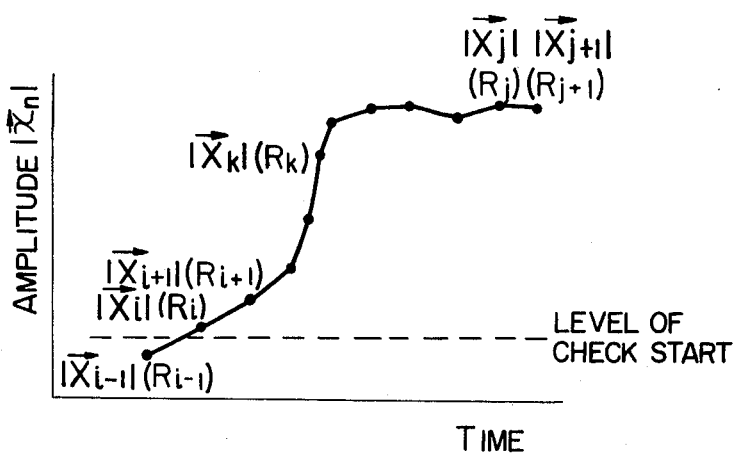
FIG. 2 is a diagram obtained by plotting the amplitude of vibration due to mass unbalance in relation to time, showing also the rate of change of the vibration amplitude at each moment.

FIGS. 1A and 1B show the change of vibration component synchronous with the revolution of a rotor in relation to time, as observed when an abrupt mass unbalance is generated in the rotor. FIG. 1B shows a special case in which a small peak in amplitude is produced immediately after the leading edge of amplitude. This peak of amplitude is transient and is quickly attenuated so that the feature of vibration upon generation of abrupt unbalances can be practically represented by the curve in FIG. 1a. FIG. 2 shows a plot at every measurement of vibrations for the illustration of judgement of abrupt unbalances, in which $|x_i|$ represents an amplitude of the component synchronous with the revolution of the shaft at the time i of vibration measurement. Characters such as $R_i$ represent rates of change in amplitude of the component synchronous with the revolution of the shaft at the corresponding time of vibration measurement. The broken line in FIG. 2 represents a level of an amplitude of an unbalanced vibration corresponding to that rate of change of amplitude. When rates of change in amplitudes of the unbalanced vibration exceed such level, diagnosing is started to determine whether the unbalanced vibration is due to an abrupt unbalance. In FIG. 2, $|\vec{x_n}|$ is a general representation of $|\vec{x_i}|$, $|\vec{x_k}|$, etc. For example, $|\vec{x_i}|$ is $|\vec{x_n}|$ when n=i.

FIG. 3 shows a flow diagram of the vibration diagnosis method for rotary machines, in accordance with the present invention. At first, the measurement of vibration of a rotor revolving at a constant speed is commenced. The measured vibration of the rotor shaft is usually journal vibration at the bearings. The vibration thus measured is an overall vibration including all frequency components. Vibration component of a frequency synchronous with the revolution of the rotor is extracted from this overall vibration.

It is determined in step 304 if an unbalanced vibration is taking place depending on whether the proportion of the vibration component obtained in step 303 and synchronous with the rotor revolution exceeds a predetermined reference value. If the reference value is exceeded by the vibration component synchronous with the rotor revolution, processing in step 306 is effected. On the other hand, if the reference value is not exceeded, the diagnosis is completed by displaying in step 305 the vibration being due to a reason other than mass unbalance. Judgement according to step 304 is effected by using the following equation.

$$|\vec{x_i}| \geq \alpha X_i \tag{1}$$

In equation (1) above, $\vec{X_i}$ represents the vector of unbalanced vibration at the moment i of pick-up of the vibration, while $x_i$ represents the amplitude of the overall vibration. The symbol $\alpha$ represents the unbalance discrimination coefficient which generally takes a value of about 0.7.

The unbalanced vibration component synchronous with the revolution of the rotor is recorded as the vibration data useful for the discrimination of vibration due to thermal bow in step 312.

Then, the diagnosis of accidental unbalanced vibration is conducted in the following procedure.

When the condition expressed by the equation (1) is met in step 304, the amplitude changing rate Rn of the vibration component (synchronous with rotor revolution) is found for the amplitude $|x_i|$ at each moment, as shown in FIG. 2. $x_i$ is an amplitude of vibration which first exceeds the level represented by the broken line in FIG. 2 for the diagnosis of unbalanced vibrations, and $R_i$ is a rate of change in amplitude at the corresponding point of time.

Then, as the first step, a judgement is made as to whether the amplitude changing rate $R_i$ exceeds a predetermined set value R1 in step 306, as expressed by the following equation (2).

$$R_i > R1 \tag{2}$$

The evaluation in accordance with the equation (2) above is based upon the fact that the amplitude changing rate of the vibration component synchronous with the rotor revolution generally takes a large value immediately after an accidental generation of mass unbalance. If the equation (2) is not satisfied, the vibration is not due to an abrupt mass unbalance, and so diagnosis is effected in step 313 as to whether the vibration is due to thermal bow.

When the condition of equation (2) is met in the first step 306, the amplitude changing rate $R_{i+1}$ of unbalanced vibration at the next moment i+1 of pick-up of vibration is found and is compared with $R_i$ in such a manner as shown by the following equation (3) in step 307. If the equation (3) is not satisfied, the processing is returned to step 302 to detect vibration at a subsequent point of time, and the rate of change $R_{i+1}$ in amplitude at that point of time is obtained in step 307 to be compared with $R_{i+2}$. When $R_{i+2}$ is smaller than $R_{i+1}$, the equation (3) is satisfied. The equation (3) means that a rate of change in amplitude at a point of time is generally smaller than that immediately before the point of time. This comparison is made as the second step repeatedly at each time of pick-up of the vibration, until the condition shown by the equation (3) is met.

$$R_{i+1} < R_i \tag{3}$$

When the rates $R_{k+1}$ and $R_k$ satisfy equation (3) in step 307, a moment of time k is found at which the increase of the amplitude starts to become dull.

Then, as the third step of discrimination, comparison is repeated at each time of pick-up of vibration data, until the amplitude changing rate $R_j$ subsequent to the rate $R_k$ comes to meet the following equation (4) in step 308.

$$|R_{j+1} - R_j| < R2 \qquad (4)$$

In the equation (4) above, symbols $R_j$ and $R_{j+1}$ represents amplitude changing rates as obtained at a moment j of vibration pick-up after the moment k and at the moment j+1 of the next pick-up of the vibration, while R2, represents a predetermined second set value of amplitude changing rate. Satisfying the equation (4) means that the difference of amplitude changing rate between two successive amounts of vibration pick-up is smaller than the second value $R_2$, i.e. that the amplitude of vibration is substantially settled at a constant value.

In the second or the third step, the pick-up of the vibration is repeated until the conditions of equation (3) or (4) are satisfied. However, during this repetition, the judgement as the whether the vibration is caused by a mass unbalance and the judgement of the first step are not conducted but the judgement of second and third steps are made solely.

In the subsequent fourth step, an evaluation is made as to whether the following condition is met in step 309.

$$|R_{k,j+1}| < R3 \qquad (5)$$

In this equation, $R_{k,\ j+1}$ represents the amplitude changing rate which is determined by the amplitude $x_k$ when the increase of vibration amplitude becomes dull, the amplitude $x_{j+1}$ at the last point of time of vibration pick-up meeting the condition of equation (4), i.e. the amplitudes at the first and last picking of vibration in the third step, and the time length between the points of time k and j+1. The symbol R3 represents a predetermined third set value of amplitude changing rate.

Figure 4:
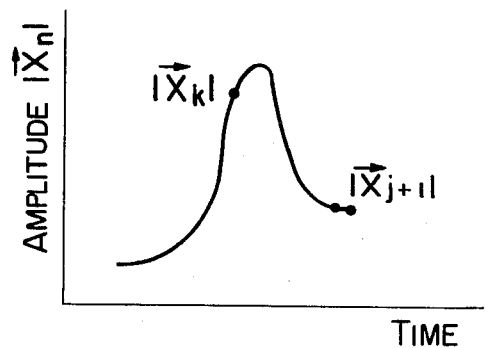
FIG. 4 is a chart obtained by plotting in relation to time the amplitudes of vibration attributable to other reason than the abrupt mass unbalance.

The fact that the condition of equation (5) is not satisfied in step 309 means that the amplitude of the vibration is changed largely immediately after the point of time k at which the increase of amplitude becomes dull, as shown in FIG. 4. This phenomenon is not the phenomenon as shown in FIGS. 1a and 1b attributable to an abrupt generation of mass unbalance.

As the conditions of equations (1) to (5) inclusive are fully met after the execution of the fourth step, a display is made to represent the occurence of an abrupt mass unbalance in the rotary machine.

Satisfying the condition of the fourth step 309 means, as mentioned before, that the difference of the amplitude between the first amplitude $x_k$ and the last amplitude $x_{j+1}$ in the third step falls below a predetermined level. It is, therefore, possible to use the condition of following equation (6) in place of the condition of equation (5) in step 309.

$$|\vec{x_k}| - |\vec{x_{j+1}}| < x \qquad (6)$$

In the equation (6), x represents the set value of amplitude used in place of R3 in the equation (5).

Taking the change of vibration due to an abrupt mass unbalance as a change in the vector of unbalanced vibration including a phase change, the conditions of equations (4) and (5) may be substituted by the following equations (7) and (8).

$$|\vec{x_{i+1}} - \vec{x_i}| \leq R2' \qquad (7)$$

$$|\vec{x_k} - \vec{x_{j+1}}| \leq R3' \qquad (8)$$

In these equations (7) and (8), $\vec{x_{i+1}}$ and $\vec{x_i}$ represent, respectively, vectors of vibration due to mass unbalance as measured at points of time i+1 and i at which the vibration is picked up, while $\vec{x_k}$ and $\vec{x_{j+1}}$ represent, respectively, vectors of vibration due to mass unbalance at the first point of time k (at which the increase of amplitude becomes dull) and the last point of time j+1 (at which the amplitude is settled) in the third step, respectively. Symbols R2' and R3' represent, respectively, the set values of unbalanced vectors corresponding to R2 and R3.

The second and third steps 307 and 308 are conducted repeatedly until the conditions of equations (3) and (4) are met. The time length required for the completion of each of the second and third steps is as short as 1 to 2 minutes at the longest.

In the case where more than 2 minutes is required for repeated pick-up of the vibration until the condition of the equation (3) is met, it is considered that the vibration is attributable to other reasons such as rubbing, to which the present invention does not pertain.

Therefore, for discriminating the vibration due to an abrupt generation of mass unbalance, the time length of each of the second and third steps is set as stated above. Alternatively, in the event that the time interval for the vibration pick-up is given, it may be possible to appoint the number of times of vibration pick-up instead of the time length. It may be also possible to appoint both of the number of times of vibration pick-up and the time length. Anyway, it is possible to discriminate whether an abnormal vibration is attributable to an abrupt generation of mass unbalance, within several minutes after the occurence of such an abnormal vibration. Since the process proceeds to the fourth step as the conditions of the first to third steps are met, the judgement is made as to whether the abnormal vibration is attributable to an accidental mass unbalance, at that point of time at which the conditions of first to fourth steps are met, before the maximum set period of time in the second and third steps has elapsed.

The aforementioned two set values R1, and R2 of the amplitude changing rate, as well as the set values R2', R3' of magnitudes of the unbalance vectors, are determined in accordance with the condition of the rotor system. The following relationship physically exists between these values.

$$R2 < R3 \qquad (9)$$

$$R2' < R3' \qquad (10)$$

Referring to FIG. 3, that noticed abnormal vibration in which the condition of the fourth step is not met is unbalanced vibration other than the phenomenon of abrupt mass unbalance. In this case, as shown by a chain line in FIG. 3, the diagnosis of unbalanced vibrations due to thermal bow is performed in step 313, and if the vibration is due to thermal bow, this is represented in step 310.

As has been stated, in the method of this embodiment, after an abnormal unbalanced vibration exceeds the check level of the unbalanced mass phenomenon as represented by the equation (1), the subsequent and the discrimination method of mass unbalance phenomenon shown by a solid line in FIG. 3 can be made by applying the same to the data stored in the memory device. Namely, the amplitude, phase and the changing rate of the vibration acquired at a constant time interval are memorized and the aforementioned process is applied to the data thus acquired within the past several minutes to discriminate whether the vibration due to an abrupt mass unbalance is taking place. In this case, while an abrupt unbalanced vibration is subject to discrimination after the occurence thereof rather than momentarily, the processing time can be shortened because the memorized data are used.

Thus, according to the method of the invention, it is possible to automatically and momentarily discriminate the abrupt generation of mass unbalance due to various reasons such as losing of rotor parts.

Referring now to FIG. 5, there is shown a vibration diagnosis apparatus generally designated by the reference numeral 100 and intended for use with a multi-bearing rotor system 1 to 3 supported by bearings 4A to 4F which may be oil-lubricated journal bearings. The vibration of the bearings 4A to 4F are detected by the vibration detectors 5A to 5F and are amplified by means of a vibrometer 7. Here, the vibration of the bearings detected by the vibration detectors 5A to 5F may be shaft vibration on the caps of the bearings 4A to 4F or near the bearings, and is in the form of an electric signal representative of the overall vibration. The vibrometer 7 serves as a voltage amplifier, and acts to output signals selected for an object of diagnosis among amplified signals from the vibration detectors 5A to 5F. The amplified vibration is then converted into digital values by means of an A/D converter 9 and is then delivered to a data processing unit 10 which is adapted to separate, from the vibration data delivered thereto, the vibration component synchronous with the revolution of the rotor. The data processing unit 10 functions to change digital vibration signals into FFT (Fast Fourier Transform), and the vibration component synchronous with the rotor revolution can be obtained from primary revolution components which are in the form of FFT. The data processing unit provides an instruction for pick-up of the vibration data and makes a processing of time signals upon receipt of inputs from a timer 23.

A pulse signal per revolution is detected by a pulse detector 6 and is converted into a sineous wave signal by a wave form converter 21. This sineous wave signal is delivered to the data processing unit 10 as a phase reference signal.

The unbalanced vibration data separated by the data processing unit 10 is delivered to an amplitude comparator 11 to be subject to judgement in accordance with the aforementioned equation (1). Also, signals of the overall vibration are provided by the data processing unit 10.

Then, as the condition of equation (1) is met, the unbalanced vibration data is delivered to an operation unit 12 for calculating the rate of change of the amplitude. If the equation (1) is not met, it is displayed via a display control unit 17 by a display unit 18 that the vibration is not due to mass unbalance. The amplitude changing rate operation unit 12 calculates the rate of changing of the amplitude, based upon time signals from a timer 23 and the unbalanced vibration data. That is, the operation unit 12 acts to output as a rate of change of amplitude at a new point of time that quotient which is obtained by dividing a difference in amplitudes of the vibration components at two successive points of time by the time lag therebetween from the timer 23. The result of the calculation is then delivered to a changing rate comparator 13 in which a comparison is made in accordance with the aforementioned equation (2). If the condition of the equation (2) is not met, the process returns again to the data processing unit 10 to pick up the next vibration data. The amplitude changing rate signal as obtained when the condition of equation (2) is met is delivered to a next comparator 14 in which a comparison is made in accordance with the aforementioned equation (3). When the condition of the equation (3) is not satisfied, the comparator 14 delivers a signal to the data processing unit 10 so as to pick up the next vibration data. When the condition of the equation (3) is met, the amplitude changing rate signal is transmitted to the comparator 15 to cause the data processing unit 10 to pick-up the vibration data until the condition of equation (4) is met. As the condition of the equation (4) is met, the signal from the comparator 15 is delivered to another compartor 16 in which a comparison is made in accordance with the aforementioned equation (5). The memory in the data processing unit 10 memorizes those results which are obtained from analyzing the amplitudes and phases of the vibration components with the rotor revolution in the data processing unit 10 and from computation in the amplitude changing rate operation unit 12. In the operation in the amplitude comparator 11, comparators 15, 16 and a changing rate comparator 13 to be hereinbelow described, the data at old points of time are delivered from the memory in the data processing unit 10. The result of this comparison is displayed by a display unit 18, through the operation of a display control unit 17.

The devices 11 to 16 mentioned above constitute in combination a vibration judging system generally designated by the reference numeral 20.

The display can be made by letters or pictures. A cathode ray tube (CRT) which permits an easy display by letters or pictures can be considered as an example of such a display unit.

Figure 6:
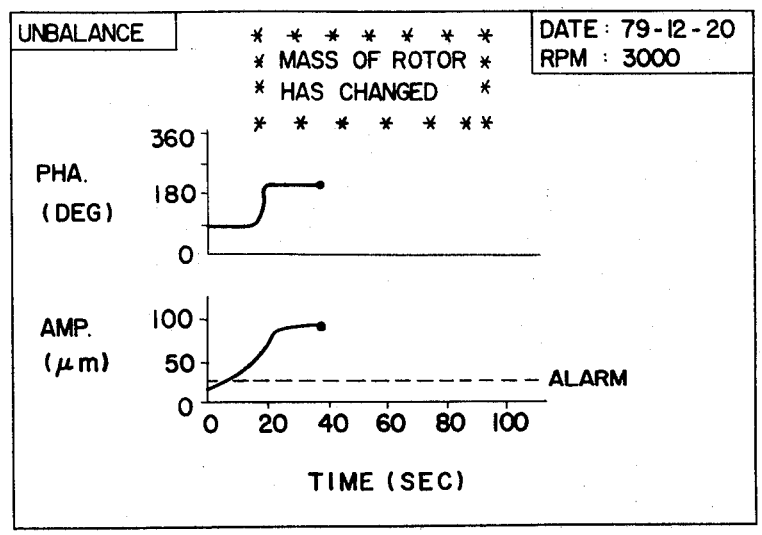
FIG. 6 is a chart showing the result of discrimination of an abrupt generation of mass unbalance by the vibration diagnosis apparatus shown in FIG. 5.

FIG. 6 shows the result of discrimination of vibration due to mass unbalance as displayed on a CRT. In FIG. 6, the indication "UNBALANCE" in the upper leftward portion thereof means that the vibration is due to mass unbalance, and the indication in the center portion thereof means that the abrupt unbalanced vibration is due to a change in mass of the rotor, that is, a failure of the rotor. In the example shown in FIG. 6, the data of the amplitude and phase of unbalanced vibration are memorized in the data processing unit in the course of discrimination and the intermediate process is shown at the time of the judgment.

Figure 7:
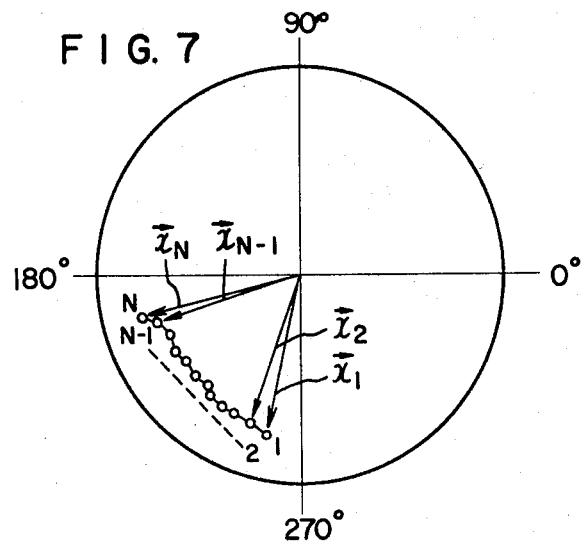
FIG. 7 is a vector chart of the phase and amplitude of a vibration component due to a thermal bow.

FIG. 7 is a vector diagram showing the amplitude and phase of the vibration component synchronous at the occurence of thermal bow of the rotor. The vibration vector is changed from $\vec{x}_1$ to $\vec{x}_2$ and then to $\vec{x}_n$ as the time lapses. It is to be noted here that, the line interconnecting the points of the vibration vectors (1 to N) is substantially linear when observed as a whole. In other words, the direction of the phase angle of difference vectors defined between the respective vibration vectors is approximately equal to each other. It is considered that this fact is characteristic of vibration due to thermal bow. The present invention is based upon this fact.

Figure 8:
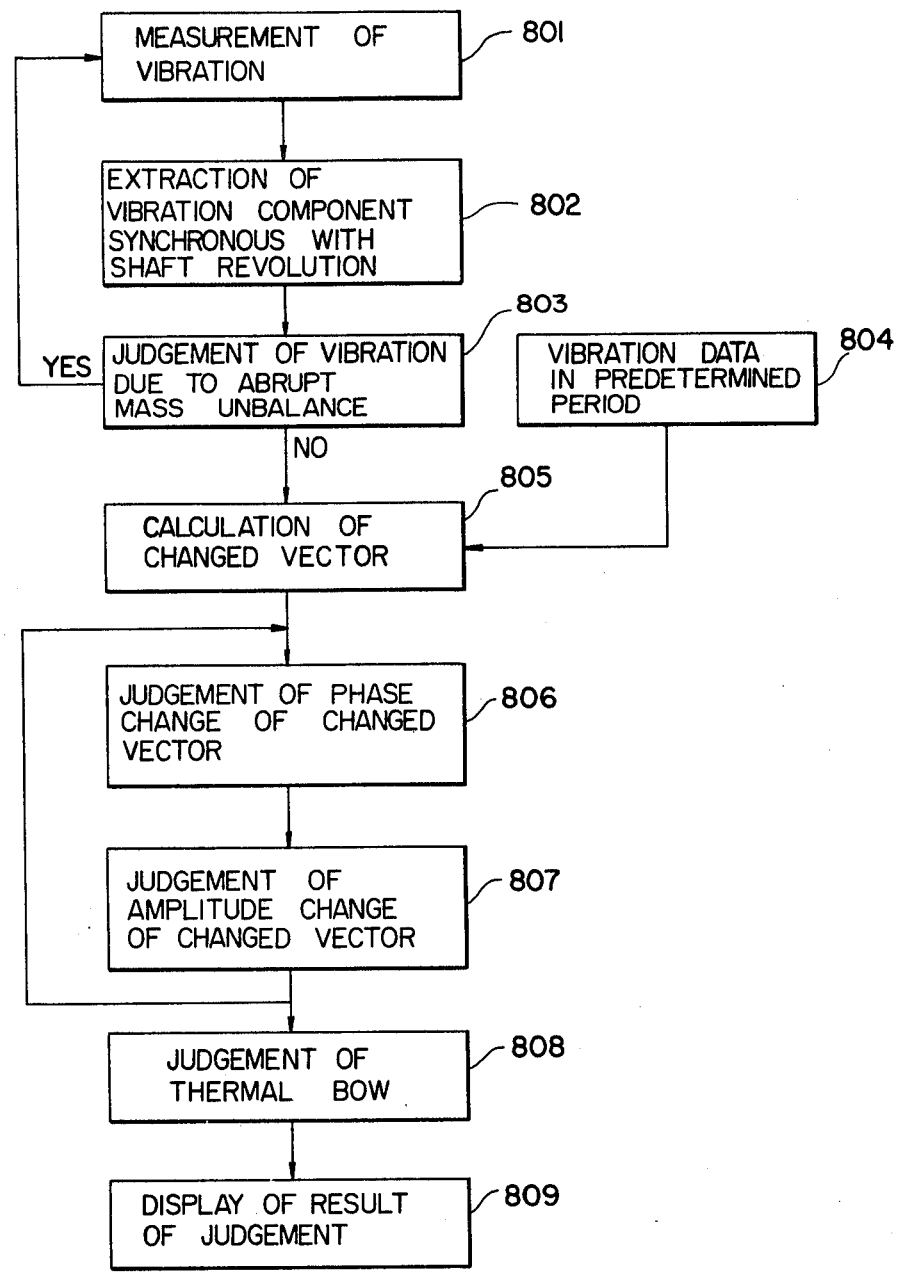
FIG. 8 is a flow diagram of vibration diagnosis method for rotary machines, in accordance with another embodiment of the invention.

FIG. 8 is a flow diagram of the vibration diagnosis method for rotary machines, as adopted when unbalanced vibration is attributable to thermal bow. In the event that the measured vibration is judged in the process shown in FIG. 3 as not being attributable to an abrupt generation of a mass unbalance in step 803, unbalanced vibration component in a period of diagnosis time T before the present point of time is picked up from the vibration data accumulated in the past in step 804, and the changed vector is calculated for each of the data in step 805, as the first step of the process. When the result of judgement in step 803 is NO which means that the unbalanced vibration is not due to any abrupt mass unbalance, diagnosis of the unbalanced vibration due to thermal bow is then performed in step 805 and in subsequent steps. When the result of judgement in step 803 is YES, the diagnosis is returned to vibration measurement in step 801 and to repetitive extraction of vibration components synchronous with the rotor revolution in step 802.

The meaning of the term "changed vector" will be explained hereinunder with reference to FIG. 9. Namely, the changed vector is the difference between the unbalanced vibration vector $\vec{x}_1$ obtained a period of time T before the present point of time and the unbalanced vibration vector $\vec{x}_2, \ldots \vec{x}_N$ obtained at each point of time up to the preset point of time. Thus, the changed vector can be expressed as follows:

$$\vec{y}_n = \vec{x}_n - \vec{x}_1 \qquad (11)$$

where, $n = 2, 3, \ldots N$.

Then, as the second step of the process, an investigation is made as to whether the phase changing rate of the changed vector $y_n$ is constant, in accordance with the following equation (12) in step 806.

$$|\theta_n - \theta_n| \qquad (12)$$

In the equation (12), $\theta_N$ represents the phase angle of the newest changed vector $\vec{y}_N$, $\theta_n$ represents the phase angle of the changed vector $\vec{y}_n$ and $\theta_B$ represents the phase change judging angle where $n = 2, 3, \ldots, N-1$. The phase angle $\theta_N$ determines the direction of change of the vibration throughout the period of diagnosis time T, and is compared with the phase angle $\theta_n$ of changed vector $y_n$ at each moment to provide a judgement at each moment as to whether the difference is within a predetermined range $\theta_B$.

Then, as the third step of the process, an investigation is made as to the tendency of the change of amplitude of changed vector in step 807. Namely, a check is made as to whether the amplitude of the vibration vector is being increased or decreased with the elapse of time.

Figure 9:
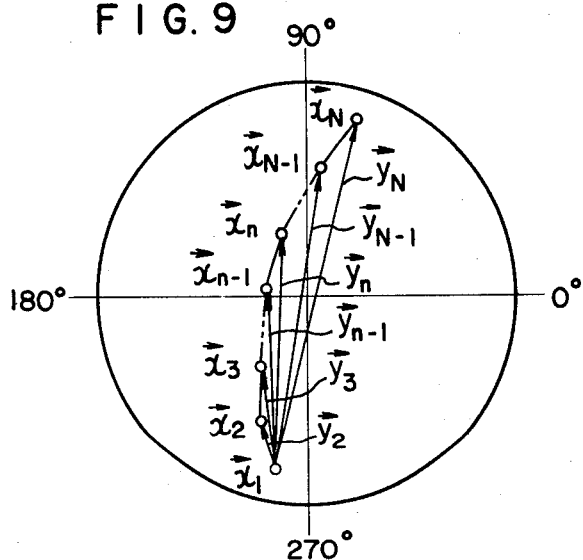
FIG. 9 is a vector chart showing the phase and amplitude of a changed vector.

For instance, referring to FIGS. 7 or 9, the vibration vectors subsequent to the vector $\vec{x}_n$ are in some cases concentrated at the region near the vector $x_n$ so that the phase and amplitude of the vibration vectors converge at constant levels. Such cases can not be dealt with by the equation (12) of the second step 806. Such a phenomenon, however, has nothing to do with thermal bow of the rotor, because thermal bow is necessarily accompanied by a continuous gradual change of the amplitude.

The check of the change in amplitude is made in accordance with the following equation (13) in step 807.

$$|\vec{y}_{n+1}| - |\vec{y}_n| > 0 \ (n=2, N-1) \qquad (13)$$

In the equation (13) above, $|\vec{y}_{n+1}|$ and $|\vec{y}_n|$ represent the amplitudes of adjacent two change vectors. The integer n takes numbers between 2 and $N-1$.

The check of phases and amplitudes of changed vectors is made for all of sets of data (number of sets being N) acquired during the period of diagnosis time T. Thus after the investigation in step 807, the investigation in step 806 is again made, and so the subsequent data is subject to similar processing.

After the completion of this check, a judgement is made as to whether the vibration is attributable to thermal bow in step 808, as the fourth step of the process.

The unbalanced vibration thus checked is a genuine vibration due to thermal bow of the rotor if the conditions of the equations (12) and (13) are met in all the data in steps 806 and 807. As a matter of fact, it is often experienced that some of the data fail to meet the above-mentioned conditions due to dispersion thereof, even if the vibration is attributable to thermal bow of the rotor. Therefore, it is reasonable to prepare surplus data meeting with the conditions of above-mentioned equations. Namely, it is judged that the vibration is caused by thermal bow of the rotor, even if the data failing to meet the conditions of equations (12) and (13) amounts to 10% or so of all of the data acquired in step 808.

Finally, the result of judgement is displayed on or outputted to a suitable display device such as a CRT or a line printer in step 809.

The rate of change of vibration attributable to thermal bow of the rotor varies depending on the kinds of rotors of the power generating plant, conditions of operation and other factors. The period of diagnosis time T, therefore, cannot be given definitely but is usually selected to fall between 10 to 60 minutes.

In the embodiment described heretofore, the direction of the difference $\vec{y}_N$ between the vectors $\vec{x}_1$ and $\vec{x}_N$ obtained at the beginning and end of the period of diagnosis time T as shown in FIG. 9 is used as reference of the phase. Alternatively, a straight line (b) obtained by a minimum square method may be used such that dispersion in the vibration vectors $\vec{x}_1, \vec{x}_2 \ldots, \vec{x}_N$ is least, as shown in FIG. 10.

Figure 10:
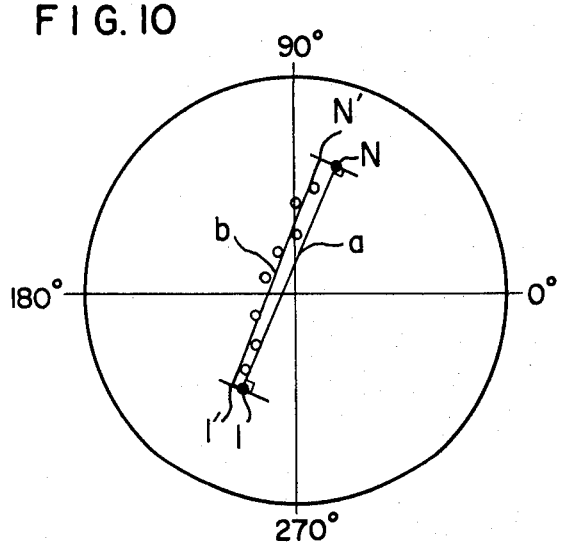
FIGS. 10 and 11 are illustrations of different vibration diagnosis methods for rotary methods in accordance with the invention.

Referring to FIG. 10, the data obtained at the beginning and end of the period of diagnosis time T, i.e. the positions of the points of the vibration vectors $\vec{x}_1$ and $\vec{x}_N$, are moved from 1 to 1' and from N to N', respectively.

By using the minimum square method as stated, the influence of dispersion in the data is reduced to provide a more reliable judgement of direction of change of the vector. It is possible to select as the time interval of the measurement of vibration data $\vec{x}_1$ to $\vec{x}_N$ one minute so as to use the data obtained at the interval of one minute for the diagnosis. However, if a plurality of data are available in one minute, i.e. at each several seconds, the mean value of such data at every one minute may be used the diminish dispersion of data for improvement of the reliability of the data. Also, by using a monthly data as the diagnosis data, it is possible to diagnose the yearly change of bending of the rotor.

Figure 11:
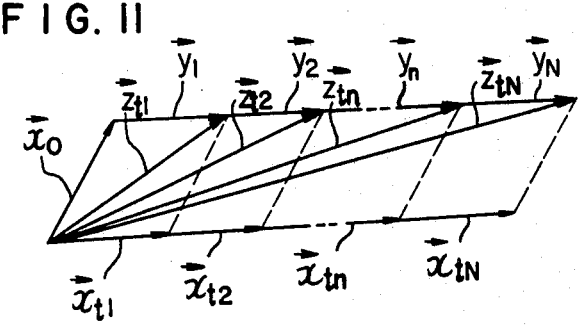

FIG. 11 shows the principle of a method for discriminating a vibration due to thermal bow of the rotor in accordance with another embodiment of the invention.

In FIG. 11, the symbol $\vec{x}_o$ represents an unbalanced vibration vector of unbalance due to thermal bow. $\vec{x}_{t1}$, $\vec{x}_{t2} \ldots$, $\vec{x}_{tN}$ represent unbalanced vibration vectors which vary with the elapse of time t after the occurence of thermal bow of the rotor. A resultant vector $z_{tn}$ of the two vibration vectors $x_o$ and $x_{tn}$ is given by the following equation (14).

$$\vec{z}_{tn} = \vec{x}_o + \vec{x}_{tn} \ (n=1, 2, \ldots N) \tag{14}$$

After a generation of thermal bow of the rotor, vibration as expressed by the resultunt vector $\vec{z}_{tn}$ is observed. The changed vector $y_1, y_2, \ldots y_N$ which correspond to the difference between the respective resultunt vectors are in substantially the same direction. Namely, the changed vectors are in the same direction provided that the direction of vector $\vec{x}_{tN}$ after generation of unbalanced vibration due to thermal bow is constant. Assuming the position where thermal bow is produced, provided that the influence coefficient A for said position is known, the unbalanced $\vec{w}_n$ due to thermal bow is given by the following equation (15).

$$\vec{w}_n = \vec{y}_n / A \tag{15}$$

Since the vector $\vec{y}_n$ is measurable, it is possible to known whether there is produced thermal bow, through examining the change of the phase and amplitude of the unbalance vector $\vec{w}_n$ with the passage of time, which unbalance vector is founded by the equation (15). Namely, it is possible to know the presence or absence of thermal bow by confirming that only the amplitude $|\vec{w}_n|$ is being increased or decreased in one direction without any change in the phase angle of $\vec{W}_n$. The above-described method ensures a high reliability in diagnosing the abnormal vibration attributable to thermal bow of the rotor, and can suitably be automated.

Figure 12:
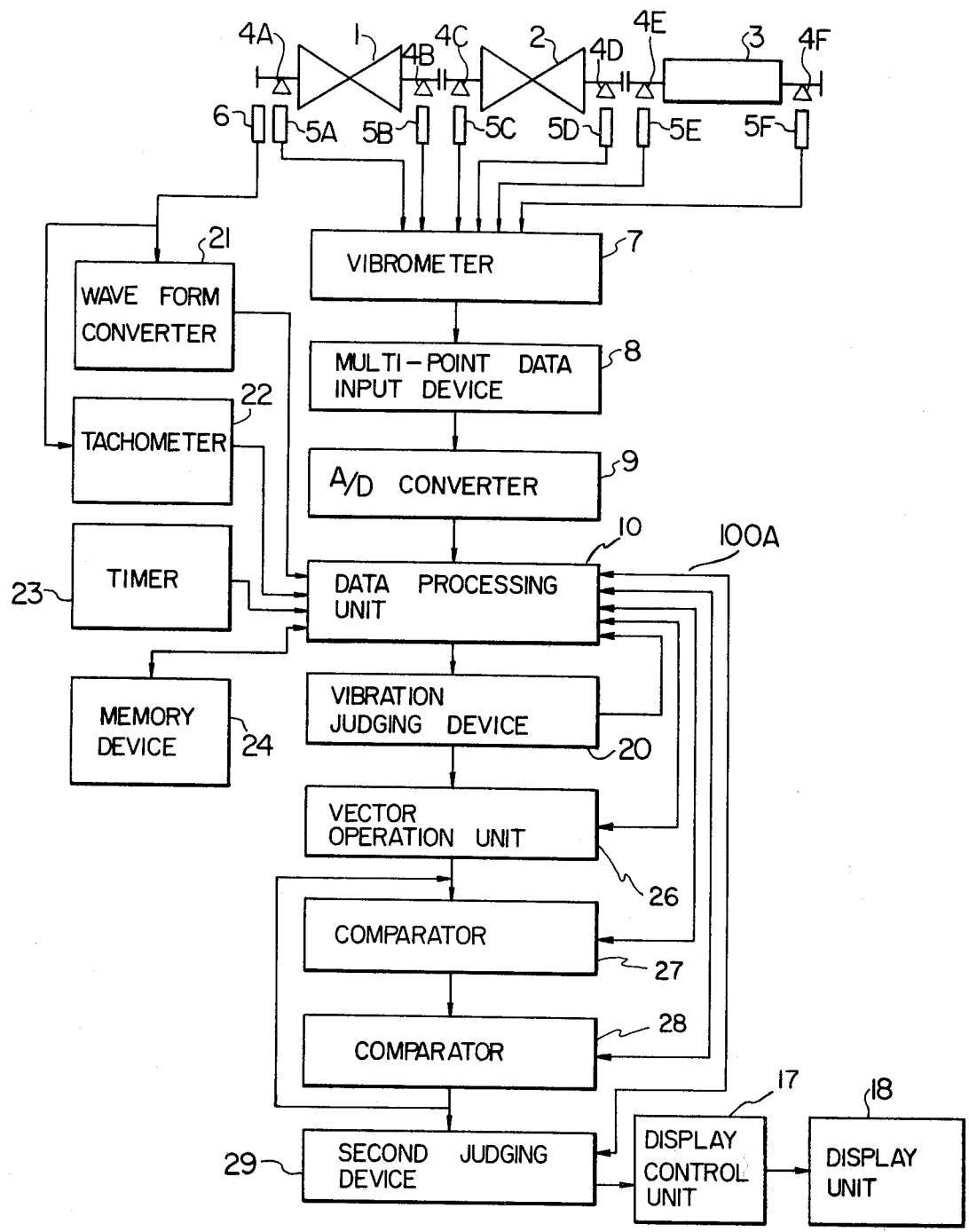
FIG. 12 is a schematic illustration of a vibration diagnosis apparatus for rotary machines, in accordance with another embodiment of the invention.

FIG. 12 shows a vibration diagnosis apparatus for discriminating the vibration of rotor shaft attributable to thermal bow in the rotor, constructed in accordance with another embodiment of the invention. The apparatus generally designated by the reference numeral 100A is applied to a multi-bearing rotor shaft system 1 to 3 including a turbine rotor shaft and an generator rotor shaft supported by bearings 4A to 4F which may be oil-lubricated journal bearings. The vibrations of the bearings 4A to 4F are detected by vibration detectors 5A to 5F, amplified by a vibrometer 7, and then inputted to an A/D converter 9 through a multi-point data input device 8 which comprises a sample hold circuit for simultaneously picking up a multiplicity of analog vibration signals, and a filter for eliminating the component of unnecessary frequency at the time of signal pick-up. The vibrometer 7 comprises a corresponding number of amplifiers to that of the vibration detectors 5A to 5F, and the inputs are simultaneously delivered to the multi-point data input device 8 from all the measuring points. The outputs of the vibration detectors 5A to 5F are electric signals representative of the amplitude of the overall vibration.

The vibration signal converted by the A/D converter 9 into a digital signal is delivered to a data processing unit 10. The data processing unit 10 is adapted to extract the vibration component synchronous with the revolution of the rotor from the vibration data delivered thereto. Fast Fourier Transform Method is used as ameasure for extracting the vibration component synchronous with the rotor revolution. Therefore, the data processing unit 10 makes processing of reference signal and time signal necessary for the vibration analysis, upon receipt of a signal from a waveform converter 21 and a timer 23.

Namely, a pulse signal per revolution of the rotor is delivered to the waveform converter 21 which converts the same into sineous waveform which is used in the data processing unit 10 as the reference signal for the vibration analysis.

At the same time, the output from the pulse detector 6 is amplified and transformed into a digital signal in the tachometer 22 and is delivered to the data processing unit 10.

The multiplicity of vibration data on multiplicity of points are memorized in a memory device 24 together with the time and revolution speed. Here, it is to be noted that the vibration data comprises amplitudes and phases of the vibration components synchronous with the rotor revolution at respective measuring points and an amplitude of the overall vibration. At the same time, these data are delivered to a vibration judging device 20 (See FIG. 5) for judging the vibration due to abrupt generation of mass unbalance. In this case, the inputs from the data processing unit 10 are delivered to the vibration judging device 20 per each measuring point corresponding to the vibration detectors 5A to 5F. The device 20 is adapted to discriminate whether the vibration under diagnosis is attributable to an abrupt generation of mass unbalance. If a judgement is made that the unbalanced vibration under diagnosis is caused by other reason than the abrupt generation of mass unbalance, all of the vibration data acquired within a predetermined period of diagnosis time T are delivered to a vector operation unit 26 in which vector operation is made in accordance with the aforementioned equation (11).

In the vector operation in this step, the data of vibration component synchronous with the rotor revolution, which are memorized in a storage unit 24 within the period of time T retroacting from the present point of time, e.g. within T seconds up to the present point of time, are used as the data within the abovementioned period of diagnosis time T. The result of operation in the vector operation unit 26 is memorized through the data processing unit 10 in the memory device 24. Subsequently, the tendency of phase change is checked by a comparator 27 in accordance with the equation (12) and, then, the tendency of amplitude change is checked by a comparator 28 in accordance with the equation (13). The data required to the checking in the comparators 27 and 28 are delivered to the comparators through the data processing unit 10 from the memory device 24, and the checking in the comparators is repetitively effected for all the data obtained within the period of diagnosis time T. The result of respective checking in the comparators 27 and 28 is memorized through the data processing unit 10 by the memory device 24.

A second judging device 29 makes a final decision as to whether the vibration of the rotor is attributable to thermal bow of the rotor, upon receipt of the outputs from the comparators 27 and 28 which have been memorized in the memory device 24. In the second judging device 29, the number of the data which satisfy the conditions imposed by the comparators 27 and 28 is counted, and the ratio of the number of such data to the number of all the data is calculated. In the described embodiment, it is essential that the comparison of equations (12) and (13) made by the comparators 27 and 28 are met by more than 80% of the total number of sets of data.

Figure 13:
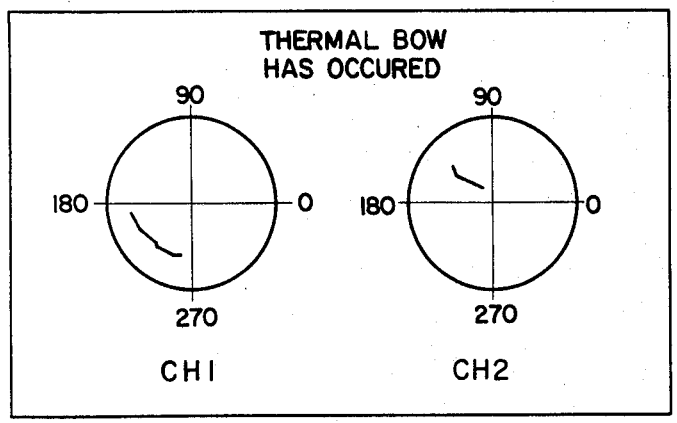
FIG. 13 is a chart showing the result of discrimination of vibration due to a thermal bow, by the vibration diagnosis apparatus shown in FIG. 12.

The result of the judgement made by the second judging device 29 is displayed on a display unit 18 through the operation of a display control unit 17. FIG. 13 shows an example of the apparatus which incorporates a CRT as the display unit. In this case, the comment on the diagnosis result is displayed together with the vibration data which are used in the diagnosis. That is, the result of diagnosis as to whether thermal bow has occured is indicated in the upper portion of the drawing. The vector diagram in the lower portion of the drawing assists in clarifying the result of the diagnosis, which diagram indicates vectors of the unbalanced vibration at the points of the diagnosis CH1 and CH2 (corresponding to the measuring points 5A and 5B in FIG. 12) within the period of diagnosis time T. The locus of the vectors of the unbalanced vibration has a fature corresponding to that in FIG. 7, from which it is recognized that the unbalanced vibration is due to thermal bow. After displaying is finished, the above-described process is repeated for the data of the next moment.

Although the invention has been described through its preferred forms, it is to be noted here that the described embodiments are not exclusive, and various changes and modifications may be imparted thereto without departing from the scope of the invention which is delimited solely by the appended claims.

What is claimed is:

1. A vibration diagnosis method for rotary machines comprising the steps of measuring vibration of the rotor shaft of a rotary machine; extracting from the measured overall vibration the vibration component synchronous with the revolution of said rotor shaft; comparing the amplitude of the vibration with the amplitude of the overall vibration; analyzing said synchronous vibration; judging the result of the analysis of the synchronous vibration component; and displaying the result of the judgement in a diagrammatical manner; said step of analyzing the synchronous vibration component including comparing the rate of change of said vibration component with a first value, and comparing the rates of change of amplitude of the vibration component at two adjacent points of time, while said step of judging includes a judgement as to whether a vibration attributable to an abrupt generation of mass unbalance is taking place.

2. A vibration diagnosis method for rotary machines as claimed in claim 1 wherein the step of analyzing the synchronous vibration component includes the step of comparing the absolute value of difference between the unbalanced vibration vectors at two adjacent points of time with a first set value of the unbalance vector.

3. A vibration diagnosis method for rotary machines as claimed in claim 2 wherein the steps of analyzing the synchronous vibration component further includes the step of comparing a difference between the unbalance vibration vector at a first point of time at which the amplitude changing rate begins to become smaller at a later point of time than at an earlier point of time and the unbalance vibration vector at a second point of time at which the absolute value of the difference between the unbalance vibration vectors at two adjacent points of time begins to be smaller than said first predetermined set value of unbalance vector, with a second predetermined value of the unbalance vector.

4. A vibration diagnosis method for rotary machines as claimed in claim 1 wherein the step of analyzing the synchronous vibration includes the step of comparing an amplitude changing rate with a third predetermined value, said amplitude changing rate being determined from the vibration amplitude at a first point of time at which the amplitude changing rate begins to become smaller at a later point of time than at an earlier point of time, the vibration amplitude at a second point of time at which the difference of amplitude changing rates between two adjacent points of time begins to be smaller than said second predetermined value, and the time interval between said first and second points of time.

5. A vibration diagnosis method for rotary machines as claimed in claim 1 characterized by further comprising the step of picking up and memorizing an amplitude, phase and amplitude changing rate of unbalanced vibration at each constant interval, as the data for comparison with predetermined set values, and wherein the step of analyzing the synchronous vibration is conducted on the basis of said data acquired during a predetermined period of time before the present point of time.

6. A vibration diagnosis method for rotary machines comprising the steps of measuring vibration of the rotor shaft of a rotary machine; extracting from the measured overall vibration the vibration component synchronous with the revolution of said rotor shaft; comparing the amplitude of the synchronous vibration with the amplitude of the overall vibration; analyzing said synchronous vibration; judging the result of the analysis of the synchronous vibration component; and displaying the result of the judgement in a diagrammatical manner; the step of analyzing the synchronous vibration component further including the step of comparing a difference between the rates of change of the amplitude of vibration components at two adjacent points of time with a second predetermined value.

7. A vibration diagnosis method for rotary machines as claimed in claim 6 wherein said step of analyzing said synchronous vibration component includes the step of comparing a difference between the vibration amplitude at a first point of time at which the vibration amplitude changing rate begins to become smaller at a later point of time than at an earlier point of time and the vibration amplitude at a second point of time at which the difference between vibration amplitude changing rates at two adjacent points of time begins to be smaller than said second predetermined value, with a predetermined amplitude value.

8. A vibration diagnosis method for rotary machines comprising the steps of measuring vibration of the rotor shaft of a rotary machine; extracting from the measured overall vibration the vibration component synchronous with the revolution of said rotor shaft; comparing the amplitude of the synchronous vibration with the amplitude of the overall vibration; analyzing said synchronous vibration; judging the result of the analysis of the synchronous vibration component; and displaying the result of the judgement in a diagrammatical manner; and further comprising the step of memorizing a plurality of vibration data synchronous with the revolution of rotor shaft and obtained in a predetermined period of time; and wherein the step of analyzing the synchronous vibration component includes the steps of successively calculating, when the vibration of said rotor shaft is not attributable to an abrupt generation of mass unbalance, change of vibration vectors of the memorized vibration data with the passage of time, and judging whether there exists an unbalanced vibration due to thermal bow of said rotor, through analyzing change of vibration vector with the passage of time, in respect to phase and amplitude.

9. A vibration diagnosis method for rotary machines as claimed in claim 8 wherein said step of analyzing change of vibration vector with the passage of time includes the step of finding a difference between the first and last unbalanced vibration vectors in a predetermined period of time, and successively examining directions of respective differences between said first unbalanced vibration vector and successive unbalanced vibration vectors with said first-mentioned difference as the reference.

10. A vibration diagnosis method for rotary machines as claimed in claim 9 wherein, as the reference direction for examining the direction of change of said unbalanced vibration vectors, the direction of a line obtained by the least squares method is used for each of the vibration vectors being examined.

11. A vibration diagnosis method for rotary machines as claimed in claim 8 wherein said step of analyzing the change of the vibration vector with the passage of time includes the step of successively finding differences between unbalanced vibration vectors at each of subsequent points of time and the first unbalanced vibration data obtained data in a predetermined period of time, and then analyzing the change of the differences with the passage of time.

12. A vibration diagnosis method for rotary machines as claimed in claim 8 wherein the plurality of vibration data in the predetermined period of diagnosis time are the data stored in a memory device.

13. A vibration diagnosis method for rotary machines as claimed in claim 8 wherein the plurality of vibration data in the predetermined period of diagnosis time are mean values of a plurality of vibration data obtained at each unit period of time, a plurality of which combines to make said predetermined period of time.

14. A vibration diagnosis method for rotary machines as claimed in claim 8 wherein said plurality of vibration data in said predetermined period of time are a plurality of monthly vibration data which permit a diagnosis of yearly change in the bowing of said rotor shaft.

15. A vibration diagnosis method for rotary machines as claimed in claim 8 wherein said step of analyzing the change of vibration vectors with the passage of time includes the steps of finding unbalance vectors for the plurality of vibration data obtained in a predetermined period of time by using the influence coefficient of an assumed position of mass unbalance, and analyzing the change in the phase and amplitude of the unbalance vector with the passage of time.

16. A vibration diagnosis apparatus for rotary machines, comprising: a vibration detector for detecting vibration of a rotor shaft of a rotary machine; an A/D converter for analog-to-digital conversion of said vibration signal; a data processing unit for extracting from the converted vibration signal the vibration component synchronous with the revolution of said rotor shaft; a waveform converter for imparting a phase reference signal to said data processing unit; a timer clock adapted to impart a timing signal to said data processing unit; a first judging device adapted to make a judgement as to whether the synchronous vibration component delivered by said data processing unit is an unbalanced vibration or not; means for analyzing the cause of said synchronous vibration component; and a display unit for displaying the result of the analysis made by the analyzing means.

17. A vibration diagnosis apparatus for rotary machines as claimed in claim 16, further comprising a memory device adapted to pick up and memorize the synchronous vibration components from said data processing unit as the data at predetermined time intervals, and, wherein the data memorized in said memory device are judged by said first judging device and analyzed said analyzing means.

18. A vibration diagnosis apparatus for rotary machines as claimed in claim 16 or 17 wherein said analyzing means include an operation unit for calculating the rate of change of amplitude of the unbalanced vibration, a comparator for comparing the calculated amplitude changing rate with a predetermined set value, a comparator for comparing the amplitude changing rate of unbalanced vibrations at two different points of time with each other, a comparator making a judgement as to whether the amplitude changing rate is substantially settled, and a comparator for making a judgement as to whether the changing rate determined by the amplitudes at the first and last points of time of the judgement made by the last-mentioned comparator falls within a predetermined range.

19. A vibration diagnosis apparatus for rotary machines as claimed in claim 16, comprising a multipoint data input device for facilitating the A/D conversion of said signals derived from said vibration detector disposed at a multiplicity of measurement points, a memory device adapted to memorize the multipoint vibration data analyzed by said data processing unit together with time and revolution speed, and a revolution signal generator for imparting a revolution signal to said waveform converter, said analyzing means including an operation unit for making the calculation of unbalanced vibration vectors, a comparator for comparing the changes in phase and amplitude of difference of unbalanced vibration vectors, and a second judging device adapted to make a judgement as to whether the unbalanced vibration is caused by thermal bow of said rotor shaft.

* * * * *